United States Patent [19]

Grenoble

[11] 4,162,356
[45] Jul. 24, 1979

[54] METHOD AND COMPOSITION FOR RENDERING FLEXIBLE SHEET MATERIAL NON-ADHERENT

[75] Inventor: Maurice E. Grenoble, Ballston Lake, N.Y.

[73] Assignee: General Electric Company, Waterford, N.Y.

[21] Appl. No.: 885,645

[22] Filed: Mar. 13, 1978

Related U.S. Application Data

[60] Continuation of Ser. No. 748,738, Dec. 9, 1976, abandoned, which is a division of Ser. No. 593,571, Jul. 7, 1975, abandoned, which is a continuation-in-part of Ser. No. 523,898, Nov. 14, 1974, abandoned.

[51] Int. Cl.$^2$ .............................................. C08L 83/04
[52] U.S. Cl. .......................................... 528/31; 528/15
[58] Field of Search ................... 260/46.5 H, 46.5 G; 428/447; 528/31, 15

[56] References Cited

U.S. PATENT DOCUMENTS

| | | | |
|---|---|---|---|
| 3,050,411 | 8/1962 | Keil | 428/447 X |
| 3,419,508 | 12/1968 | Grenoble | 260/46.5 G X |
| 3,518,325 | 6/1970 | Campbell et al. | 260/46.5 G X |
| 3,849,359 | 11/1974 | Nitzsche et al. | 260/46.5 H X |
| 3,922,443 | 11/1975 | Brown et al. | 260/46.5 G X |
| 3,936,581 | 2/1976 | Garden | 260/46.5 G X |

Primary Examiner—Lewis T. Jacobs
Attorney, Agent, or Firm—Morgan, Finnegan, Pine, Foely & Lee

[57] ABSTRACT

A solventless composition for rendering flexible sheet materials non-adherent to surfaces to which they normally adhere is disclosed. These compositions include a low viscosity vinyl chainstopped polysiloxane or a low viscosity silanol chainstopped polysiloxane with an organohydrogenpolysiloxane and a curing catalyst.

5 Claims, No Drawings

METHOD AND COMPOSITION FOR RENDERING FLEXIBLE SHEET MATERIAL NON-ADHERENT

CROSS-REFERENCE TO RELATED APPLICATION

This application is a continuation of Ser. No. 748,738, filed Dec. 9, 1976 which is a division of Ser. No. 593,571 filed July 7, 1975 which is a continuation-in-part of Ser. No. 523,898, filed Nov. 14, 1974, all abandoned.

This invention provides a solventless composition for rendering flexible sheet materials non-adherent to surfaces to which they normally adhere. These compositions are based on a low viscosity vinyl chainstopped polysiloxane or a low viscosity silanol chainstopped polysiloxane with an organohydrogenpolysiloxane and a curing catalyst.

BACKGROUND OF THE INVENTION

In the prior art, silicone compositions have been employed as release agents for materials such as pressure sensitive adhesive systems. These release agents have traditionally been solvent solutions or aqueous emulsions of reactive silicone polymers. Examples of these materials may be found in U.S. Pat. No. 2,985,545 and U.S. Pat. No. 3,814,731 which are hereby incorporated by reference. One object to these products is the problem that is related to the solvent which is evaporated during the curing stage. This solvent if vented to the atmosphere causes air pollution and this requires expensive solvent recovery equipment. Completely aqueous products present no pollution or solvent recovery problem but this type of product has had limited use for specialized applications such as asphalt and latex packaging. The use of a solvent has always been considered necessary to reduce viscosity and to make handling and coating of the silicone composition easier. Also, by proper selection of the solvent, the highly reactive polysiloxanes have been stabilized to give good shelf life to products that are normally unstable.

It has now been found that a solventless polysiloxane composition can be formulated for rendering flexible sheet materials non-adherent to surfaces to which they normally adhere. These compositions are based on the use of a low viscosity vinyl chainstopped polysiloxane or a low viscosity silanol chainstopped polysiloxane, an organohydrogenpolysiloxane and a catalyst for curing the composition. This type composition may be applied to a paper substrate without the use of a solvent. One method of applying this composition is by using a smooth roller followed by a doctor blade to remove excess composition.

DETAILED DESCRIPTION OF THE INVENTION

The solventless compositions of the invention which are useful for rendering flexible sheet materials non-adherent to surfaces which normally adhere thereto will comprise:

(a) a vinyl chainstopped polysiloxane having units of the formula:

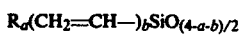

wherein R is a monovalent hydrocarbon radical, a halogenated monovalent hydrocrbon radical or a cyanoalkyl radical, a is 0 to 3, b is 0.005 to 2.0 and a plus b is 0.8 to 3 and said polysiloxane has a viscosity between 100 and 5000 cstks at 25° C.; or a silanol chainstopped polysiloxane having the formula:

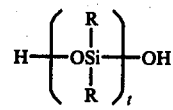

wherein R is the same as hereinabove described and t has a value which will give a viscosity between 100 and 5000 cstks.;

(b) an organic hydrogenpolysiloxane of the formula:

wherein R, a and b are the same as hereinabove described; and (c) a catalyst for curing said composition.

The preferred type of vinyl chainstopped polysiloxanes are of the formula:

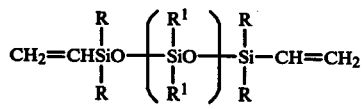

wherein R and $R^1$ are free of unsaturation and are monovalent hydrocarbon radicals, halogenated monovalent hydrocarbon radicals or cyanoalkyl radicals, with at least 50% of the $R^1$ groups being methyl and n has a value sufficient to provide a fluid material having a viscosity of from 100 to 5000 cstks. at 25° C., or more preferably from 300 to 1000 cstks. at 25° C.

The substituents R and $R^1$ may be alkyl, e.g., methyl, ethyl, propyl, butyl, octyl, etc., haloalkyl, having from 1 to 3 halogen atoms and from 1 to 8 carbon atoms, e.g., chloroethyl, bromoethyl, trifluoromethyl, 3,3,3-trifluoropropyl, etc.; R—$CH_2$—$CH_2$—, wherein R is a perfluoroalkyl having from 1-8 carbon atoms, aryl, e.g., phenyl, tolyl, xylyl, etc., cycloalkyl, e.g., cyclohexyl, cycloheptyl, etc., aralkyl, e.g., benzyl, phenethyl, etc., halogenated aryl, e.g., chlorophenyl, bromophenyl, chloronaphthyl, etc., cyanoalkyl, e.g., cyanoethyl, cyanopropyl, etc., or mixtures of any of the foregoing. These materials are described in U.S. Pat. No. 3,344,111 and in U.S. Pat. No. 3,436,366 which are both incorporated by reference.

The preferred catalysts for curing the vinyl chainstopped polysiloxane and the organohydrogenpolysiloxane are platinum catalysts.

The platinum catalyst component employed in the present invention can be any of the well known platinum catalysts which are effective for catalyzing the reaction between silicon-bonded vinyl groups. These materials include the various finely divided elemental platinum catalysts, such as those described in Bailey, U.S. Pat. No. 2,970,150, the chloroplatinic acid catalysts described in Speier, U.S. Pat. No. 2,823,218, the platinum-hydrocarbon complexes described in Ashby, U.S. Pat. No. 3,159,601 and U.S. Pat. No. 3,159,662, as well as the platinum alcoholate catalysts disclosed in Lamoreaux, U.S. Pat. No 3,220,972. Regardless of the type of platinum catalyst employed, the catalyst is used in an amount sufficient to provide from about $10^{-3}$ to $10^{-6}$ gram atoms of platinum per mole of silicon-bonded vinyl groups in the composition. On another basis, a useful range of catalyst will provide one platinum atom for each 100 to 1,000,000 silicon-bonded vinyl groups in the vinyl chainstopped polysiloxane. Especially preferably, the platinum catalyst will be present in an amount sufficient to provide from 5 to 50 parts per million of platinum based on the weight of vinyl chainstopped polyorganosiloxane component.

The preferred silanol chainstopped polysiloxanes are of the formula:

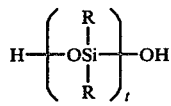

wherein R is a monovalent hydrocarbon radical and at least 50% of the R groups are methyl groups. The preferred silanol chainstopped polysiloxanes will have a viscosity of 300 to 1000 cstks. at 25° C.

The silanol chainstopped polysiloxanes are prepared by the equilibration of cyclic polysiloxanes with an alkali metal hydroxide catalyst. The desired viscosity is obtained by controlling the amount of water added to the reaction. These procedures are described in the literature and are well known to those skilled in the art.

The compositions which contain the silanol chainstopped polysiloxanes are cured with from 0.1–1% by weight of an organotin catalyst. Suitable organotin compounds include dialkyl tin salts preferably dibutyl tin salts such as dibutyl tin di-2-ethyl hexoate, dibutyl tin di-laurate, dibutyl tin diacetate and the like.

The organic hydrogenpolysiloxane can vary broadly in structure, and it may comprise a mixture of materials. One characteristic is that it has at least two silicon-bonded hydrogen atoms per molecule which act to crosslink with the other polysiloxane component.

The organohydrogenpolysiloxane will preferably be of the formula:

wherein R is as defined above, a is from 0 to 3, preferably from 1.0 to 2.10, b is from 0.005 to 2.0 preferably from 0.1 to 1.0 and the sum of a plus b is from 0.8 to 3, preferably 2.0 to 2.67. The organohydrogenpolysiloxane can be linear or cyclic in nature. One illustrative material is a liner dimethylhydrogen chainstopped dimethylpolysiloxane containing from 2 to 3 silicon atoms in the molecule. Preferred materials will have a viscosity of 10–100 cstks. at 25° C. Also, there may be employed methyl hydrogen polysiloxane or multifunctional silanes such as methyl triacetoxysilane, trimethoxysilane, triethoxysilane, tetra-isopropoxysilane, and triacetoxysilane, along with the hydrogen polysiloxane. Usually from 1 to 10% by weight of the crosslinking organohydrogenpolysiloxane is required.

The catalyst may be precoated on the substrate and the coating bath may consist of the silanol or vinyl chainstopped polysiloxane and crosslinking agent. This will extend the working life of the bath.

The vinyl chainstopped systems may be stabilized with from 100–500 ppm, preferably 200–400 ppm of acrylonitrile. The acrylonitrile will prevent the curing of the composition until it is volatilized in the coating operation.

When the compositions of the invention are used to coat paper, depositions of about 0.25–1 lb/ream of paper will produce satisfactory results.

The preferred compositions will comprise the following components in parts by weight:

| | |
|---|---|
| vinyl or silanol chainstopped polysiloxane | 5–20 |
| organic hydrogen polysiloxane | 0.1–5 |
| catalyst | 0.00001–1 |

DESCRIPTION OF THE PREFERRED EMBODIMENTS

The following examples illustrate the process of the present invention. They are illustrative and the claims are not to be construed as limiting thereto.

EXAMPLE I

The following materials were mixed and then applied to supercalendered paper with a knife coater at a deposition of about 1 lb/ream.

| | Parts by weight |
|---|---|
| Silanol stepped dimethylpolysiloxane (500 cstks. at 25° C.) | 10 |
| Methyl hydrogen polysiloxane | 1 |
| Dibutyl tin di-2-ethyl hexoate | .3 |

The coated sheet was cured for 15 seconds at 300° C. The cured sheet was smear-free and resistant to abrasion. An SBR adhesive was then applied to the coating and laminated with a face stock. Release at 400 in./min., was checked over a period of 2 months and found to remain a constant 40–50 gms/in.

EXAMPLE II

The following coating composition was prepared:

| | Parts by weight |
|---|---|
| Dimethylpolysiloxane, vinyl chainstopped (400 cstks. at 25° C.) | 10 |
| Methyl hydrogen polysiloxane (25 cstks. at 25° C.) | 0.5 |
| Acrylonitrile | 0.004 |
| Platinum (5% platinum content of a solution of chloropatinic acid in n-butanol to give a concentration by weight) | 0.00005 |

The platinum catalyst was added to the vinyl chainstopped fluid and mixed well. The acrylonitrile was then added and mixed, and finally the methyl hydrogen polysiloxane was added and mixed. The resulting solution was then applied to supercalendered kraft paper as in Example 1. The coating was repeated and cured 15 seconds at 250° F. In each case, a smear-free coating was obtained which gave the same release as Example I.

EXAMPLE III

The vinyl stopped dimethyl polymer in Example II was replaced by a vinyl stopped fluid having a viscosity of 4000 cstks. at 25° C. with the same results as in Example II. Although the higher viscosity can be cured under the same conditions as the lower, the lower viscosity is preferred since it is easier to apply as a thin coating.

Obviously, many variations will suggest themselves to those skilled in the art from the above detailed description without departing from the scope or spirit of the invention. It is, therefore, to be understood that changes may be made in the particular embodiments of the invention as defined by the appended claims.

We claim:

1. A solventless composition for rendering flexible sheet materials non-adherent to surfaces which normally adhere thereto, said composition consisting essentially of:

(a) A silanol chainstopped polysiloxane having the formula:

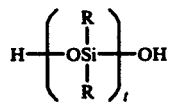

wherein R is a monovalent hydrocarbon radical or a cyanoalkyl radical and t has a value which will give a viscosity between 300 and 1000 cstks at 25° C.;

(b) An organic hydrogenpolysiloxane of the formula:

wherein R is the same as hereinabove defined, a is 0 to 3, b is 0.005 to 2.0 and a plus b is 0.8 to 3; and (c) an amount of a catalyst for curing said composition.

2. A composition as defined in claim 1 wherein the organic hydrogensiloxane is a liner methylhydrogenpolysiloxane having a viscosity of 10–100 cstks. at 25° C.

3. A composition as defined in claim 1 wherein the organic hydrogenpolysiloxane is present in an amount of from 1–10% by weight.

4. A solventless composition for rendering flexible sheet materials non-adherent to surfaces which normally adhere thereto, said composition consisting of:

(a) a silanol chainstopped polysiloxane having the formula:

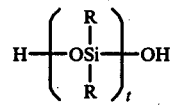

wherein R is a monovalent hydrocarbon radical or a cyanoalkyl radical and t has a value which will give a viscosity between 300 and 1000 cstks at 25° C.;

(b) an organic hydrogenpolysiloxane of the formula:

wherein R is the same as hereinabove defined, a is 0 to 3; b is 0.0005 to 2.0 and a plus b is 0.8 to 3; and (c) an amount of a catalyst for curing said composition.

5. A composition as defined in claim 4 wherein the silanol chainstopped polysiloxane has methyl groups for at least 50% of the R groups and a viscosity of 300 to 1000 cstks. at 25° C.